US012733074B2

(12) United States Patent
Heerink

(10) Patent No.: US 12,733,074 B2
(45) Date of Patent: Sep. 8, 2026

(54) SOLAR SPECTRUM SIMULATION DEVICE

(71) Applicant: Gerhardus Heerink, Vienna, VA (US)

(72) Inventor: Gerhardus Heerink, Vienna, VA (US)

( * ) Notice: Subject to any disclaimer, the term of this patent is extended or adjusted under 35 U.S.C. 154(b) by 483 days.

(21) Appl. No.: 17/528,387

(22) Filed: Nov. 17, 2021

(65) Prior Publication Data

US 2022/0353972 A1 Nov. 3, 2022

Related U.S. Application Data

(60) Provisional application No. 63/115,131, filed on Nov. 18, 2020.

(51) Int. Cl.
*H05B 47/10* (2020.01)
*F21S 8/00* (2006.01)
*H05B 47/11* (2020.01)
*H05B 47/16* (2020.01)

(52) U.S. Cl.
CPC .............. *H05B 47/11* (2020.01); *F21S 8/006* (2013.01); *H05B 47/16* (2020.01)

(58) Field of Classification Search
CPC ........ H05B 47/10; H05B 47/11; H05B 47/16; H05B 45/00; H05B 45/30; F21S 8/006
See application file for complete search history.

(56) References Cited

U.S. PATENT DOCUMENTS

2015/0035437 A1* 2/2015 Panopoulos ............ B60L 53/12
315/291

FOREIGN PATENT DOCUMENTS

CN 104100873 A * 10/2014

* cited by examiner

*Primary Examiner* — Jimmy T Vu

(57) ABSTRACT

The present invention is comprised of a novel solar radiation simulation device that simulates the sun by radiating the same spectrum of wavelengths, with the accompanying power levels, as the sun when the sun projects energy upon the Earth in accordance with the time of the day, year, and location. It will bring "the sun inside." The device can be controlled manually by an end-user or can include pre-programmed modes that control settings of the device or can be dynamically controlled through the input from solar light meters located around the world. This device improves human health but can also be used as a typical light source and can even function as an entertainment device.

18 Claims, 13 Drawing Sheets

Figure 6

| Illuminance | Example |
|---|---|
| 120,000 Lux | Brightest sunlight |
| 111,000 Lux | Bright sunlight |
| 109,870 Lux | AM 1.5 global solar spectrum sunlight (= 1,000.4 W/m$^2$) |
| 20,000 Lux | Shade illuminated by entire clear blue sky, midday |
| 1,000 – 2,000 Lux | Typical overcast day, midday |
| 400 Lux | Sunrise or sunset on a clear day (ambient illumination) |
| <200 Lux | Extreme of thickest storm clouds, midday |
| 40 Lux | Fully overcast, sunset/sunrise |
| <1 Lux | Extreme of thickest storm clouds, sunset/rise |

Figure 7
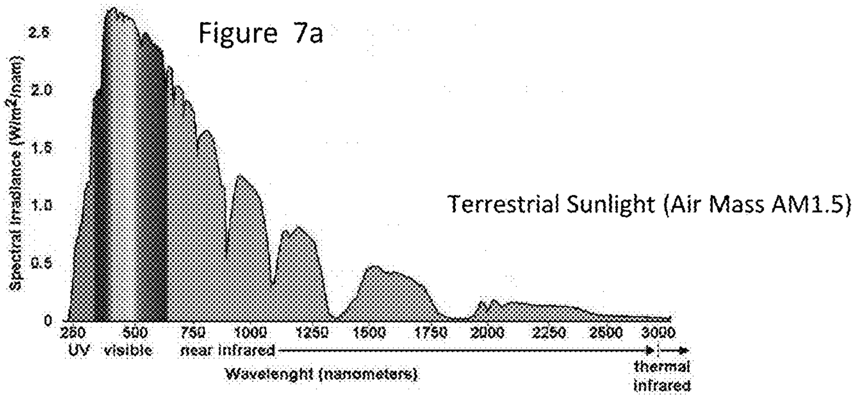
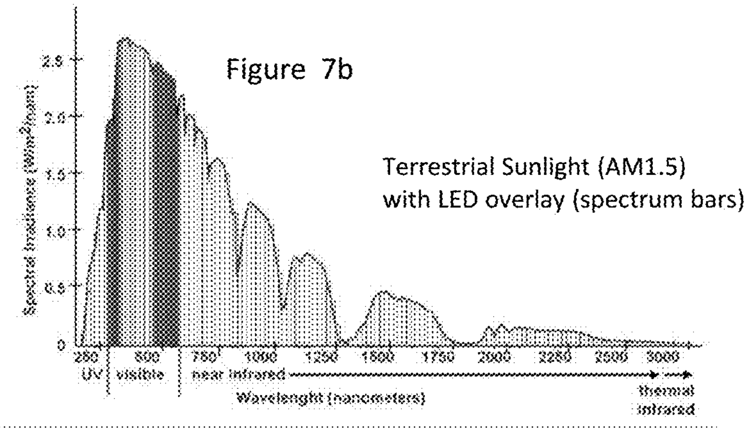
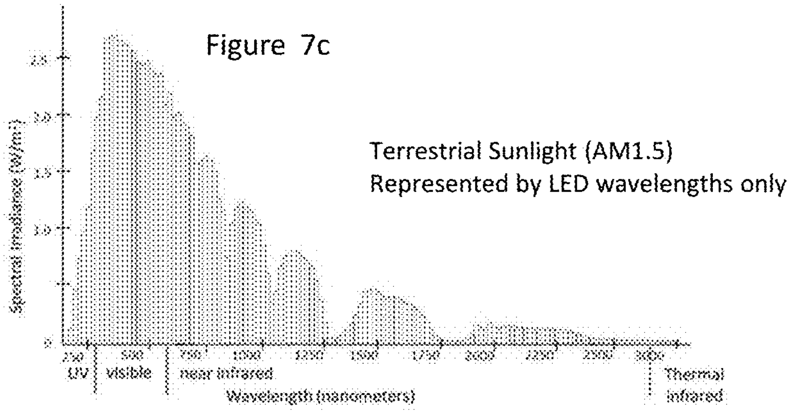

Figure 12
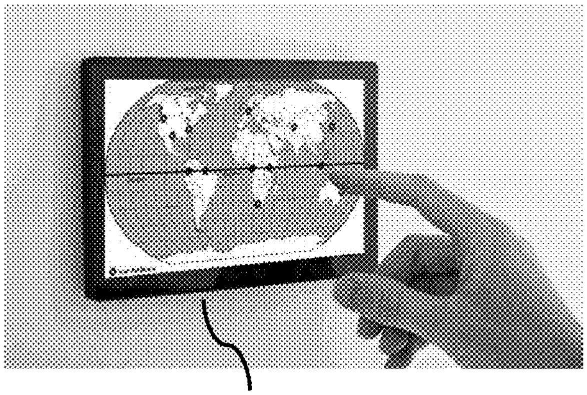
28
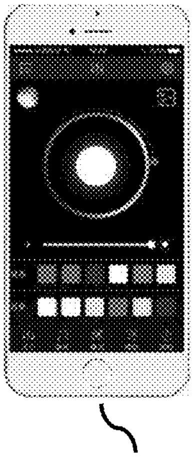
29

SOLAR SPECTRUM SIMULATION DEVICE

CROSS-REFERENCE TO RELATED APPLICATION

This application claims priority to U.S. Provisional Application Ser. No. 63/115,131, filed on Nov. 18, 2020, the entire disclosure of which is incorporated herein by reference.

BACKGROUND OF THE DISCLOSURE

1. Field of the Disclosure

The disclosure relates to a full spectrum light source to regulate and improve human health, and more particularly, health influenced by electromagnetic spectrum (light).

2. Background Art

Solar energy is essential for human well-being, and it is well-documented that sun avoidance increases all-cause mortality rates. With the introduction of Artificial Light At Night (ALAN), and the resulting avoidance of sunlight, our overall health has declined. Humans and our primal ancestors have evolved from living outdoors under the sun for millions of years. Although humans moved, for some periods during the day, inside their dwellings within the last few thousand years, it was the introduction of the light bulb in 1879 that greatly contributed to a decline in human health due to exposure to artificial light, both during the day and especially at night.

The electromagnetic (EM) energy produced by typical artificial light devices, e.g., incandescent bulbs, fluorescent lights, Light Emitting Diodes (LED), etc., does not represent the EM energy of the sun. Therefore, these typical artificial lighting devices lack the essential health benefits provided by the sun.

It is now understood that EM energy shapes life and is essential for life-sustaining functions. All living things need the sun's energy to perform at their fullest potential. New discoveries published in peer reviewed studies, especially within the last few decades, have shown that different wavelengths produce different effects on our psychology and physiology.

Our bodies have many photoreceptors (e.g., opsins, etc.) in our eyes, skin, gut, etc., that are excited by light. For instance, aromatic amino acids like histidine, phenylalanine, tyrosine, and tryptophan, are excited by a specific wavelength with absorption peaks in the UV range that start the entrainment processes to produce neurotransmitters, hormones and regulate our circadian clocks. The photopigment melanopsin, and associated ipRGCs, play an important role in the entrainment of circadian rhythms. Melanopsin, found in our eyes, with a peak light absorption at blue light wavelengths around 480 nanometers, regulates many functions such as the inhibition of melatonin release from the pineal gland and the synchronization of our internal clocks by signaling the suprachiasmatic nucleus (SCN), the "master clock" in our body.

It is still being learned how quantum biology precisely affects our health, but it is known that the absence of sunlight prevents humans from living healthy lives to their fullest potential and the lack of a balanced solar spectrum, in sync with our circadian rhythm, will wreak havoc on our health. Conditions are made worse by exposing humans to artificial light since it starts the wrong entrainment process at the wrong time and leads to health issues.

Several manufacturers claim to produce "full spectrum" lighting devices and are marketed to improve human health. However, these devices omit many of the wavelengths projected by the sun upon the Earth and certainly do not represent the crucial spectral power-levels of the sun. Even circadian lighting devices, within the Human Centric Lighting (HCL) "movement," fall short because they do not represent the sun's full electromagnetic output since they mainly focus on only a few of the wavelengths within the visible spectrum (VIS) and often do not include ultraviolet (UV) and infrared (IR) wavelengths of terrestrial sunlight which is approximately <10% UV, ~43% VIS, and ~47% IR. Every part of the spectrum, as a photon with its unique spectral power level, acts just like computer software code and instructs the computer how to run. Like omitting lines in the software program will mess-up the program and the computer will not work properly or run at all, not getting the full solar spectrum will prevent the human body from functioning properly.

Current available circadian lights focus only on the color temperature (Kelvin) to match the sun's colors during the day. This is accomplished by "mixing" only a few wavelengths to create the desired color and many of the essential wavelengths are missing. The changing of these color temperatures is accomplished by pre-programmed modes based upon the times (morning-afternoon-evening) of the day and are therefore very limited and not representative of the real sun's settings.

Other solar, or sun, simulators are designed and intended for laboratory R&D and testing purposes and are missing many features and capabilities, especially the spectral range (250-3000 nm) that is needed to regulate life-sustaining modalities, to improve and maintain human health. In the past, the sun simulators used in labs consisted of bulbs (e.g., Xenon) but within the last few years, they have moved to Light Emitting Diodes (LED). These industrial sun simulators are not optimized, or practical, for human health purposes and are too expensive for such use.

SUMMARY OF THE DISCLOSURE

The present invention is comprised of a solar spectrum radiation device that simulates the sun's electro-magnetic energy (EM) representing the full solar spectrum measured at earth's sea level. The device will provide the correct wavelengths (nm), irradiance (W/m2), and illuminance (LUX).

The solar spectrum projection of the device is fully automated in accordance with the time of the day, time of the year, altitude, and location. In preferred embodiments, the device's illumination source can be housed in either a ceiling-mounted fixture, standing floor/desk lamp, wall panels, or Edison screw bulbs. In some configurations, the light source can consist, but is not limited to, Light Emitting Diodes (LEDs) whereas each LED represents a at least one specific wavelength that can be individually controlled to turn on/off and regulate the irradiance levels. Multiple LEDs of different wavelengths, combined, will represent the simulated solar spectrum as measured upon the Earth's surface. The device can either be controlled by pre-programmed instructions and/or by manual end-user input. It can also be part of an Internet of Things (IoT) cloud-based platform to receive input from solar EM meters located around the world.

A broad characterization of benefits of this Solar Spectrum Radiation Device includes, but is not limited to, human health improvement, a lighting device, a jet lag preparation and recovery device, and an entertainment device.

BRIEF DESCRIPTION OF THE DRAWINGS

The disclosure will now be described with reference to the drawings wherein:

FIG. 6 illustrates the solar intensity (LUX) under different conditions.

FIG. 7 illustrates three graphs of the terrestrial sunlight spectrum, at AM1.5, in 3 different configurations, without and with LEDs overlay.

FIG. 7*a* illustrates the terrestrial sunlight without any added LEDs overlay.

FIG. 7*b* illustrates the terrestrial sunlight with the overlay of LEDs whereas the LEDs represent the individual wavelengths.

FIG. 7*c* illustrates the terrestrial sunlight represented by the LEDs only.

FIG. 12 illustrates two of the possible controller hardware embodiments (LCD screen and mobile App on a mobile device)

DETAILED DESCRIPTION OF THE DISCLOSURE

Figure 1:
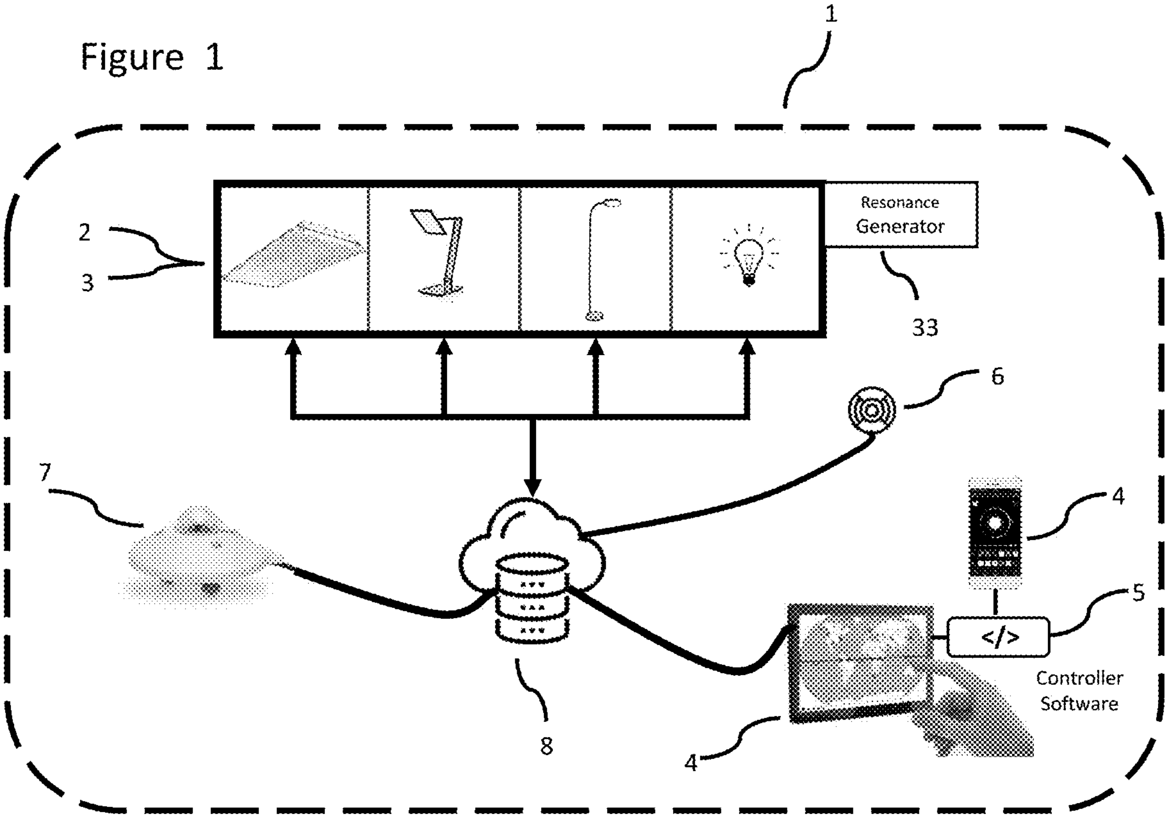
FIG. 1 illustrates an example system for Solar Spectrum Simulation Device, in accordance with a few embodiments disclosed herein.

Although certain configurations of the configurations will be shown and described in detail, it should be understood that various additional changes and modifications not specifically described herein may be made without departing from the scope of the constituting components, the materials thereof, the shapes thereof, the relative arrangement thereof, etc., and are disclosed simply as examples of configurations.

The terminology used herein is for the purpose of describing particular configurations only and is not in-tended to be limiting of the configurations. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this configurations belong. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the configurations, it will be understood that a number of techniques and steps are disclosed. Each of these has an individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that all such combinations are entirely within the scope of the configurations and the claims.

When using the terminology "power levels", it refers either to irradiance, radiance, or illuminance, or all combined, of the light source.

A need exists for a novel device that simulates the sun in every aspect as the sun projects EM energy upon the Earth. The device disclosed herein "brings the sun inside" to improve human health but can also function as a typical lighting/illumination device and can even function as an entertainment device.

A Solar Spectrum Simulation Device is disclosed herein. In the following description, for purposes of explanation, numerous specific details are set forth in order to provide a thorough understanding of the present configurations. It will be evident, however, to one skilled in the art that the present configurations may be practiced without these specific details.

The present disclosure is to be considered as an exemplification of the configurations and is not intended to limit the configurations to the specific configurations illustrated by the figures or description below.

In one embodiment, the device 1 comprises of several components such as, but is not limited to, at least one light panel 2 with embedded power-supply/driver 3, at least one controller hardware 4, controller software 5 which can be embedded in the controller hardware 4 or IoT (cloud based) platform 8, at least one sensor 6, at least one light meter 7 and an Internet of Things (IoT) platform 8.

Figure 2:
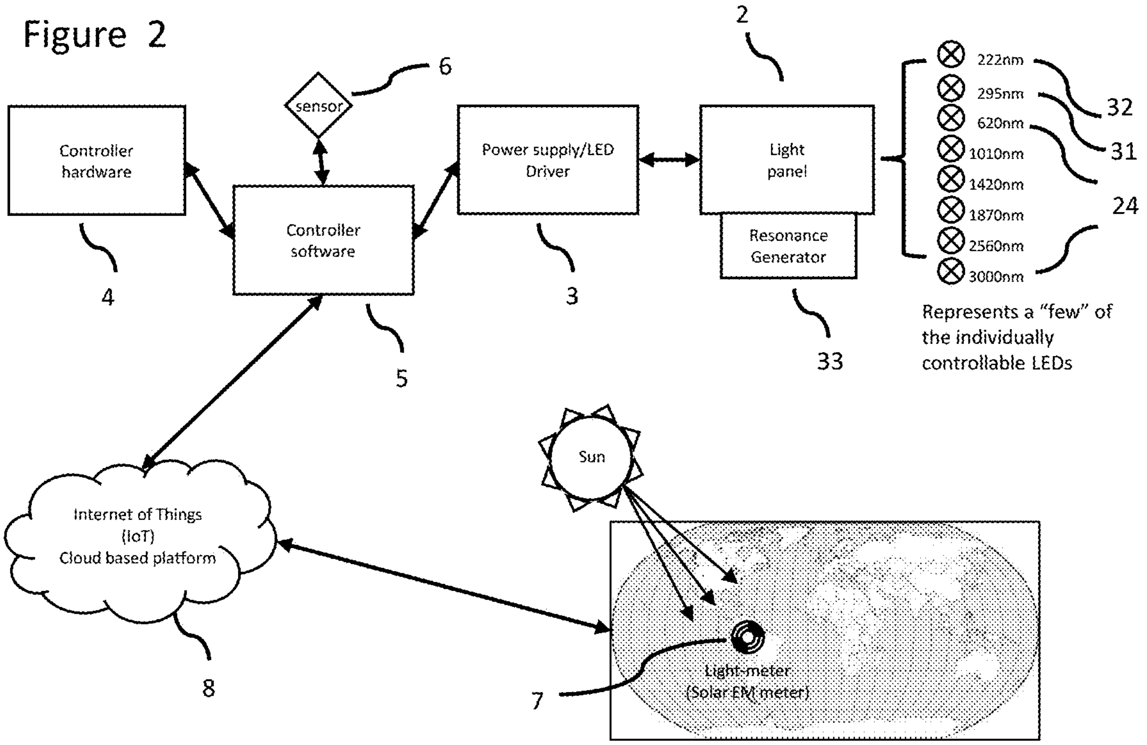
FIG. 2 illustrates a diagram of the system components.
Figure 3:
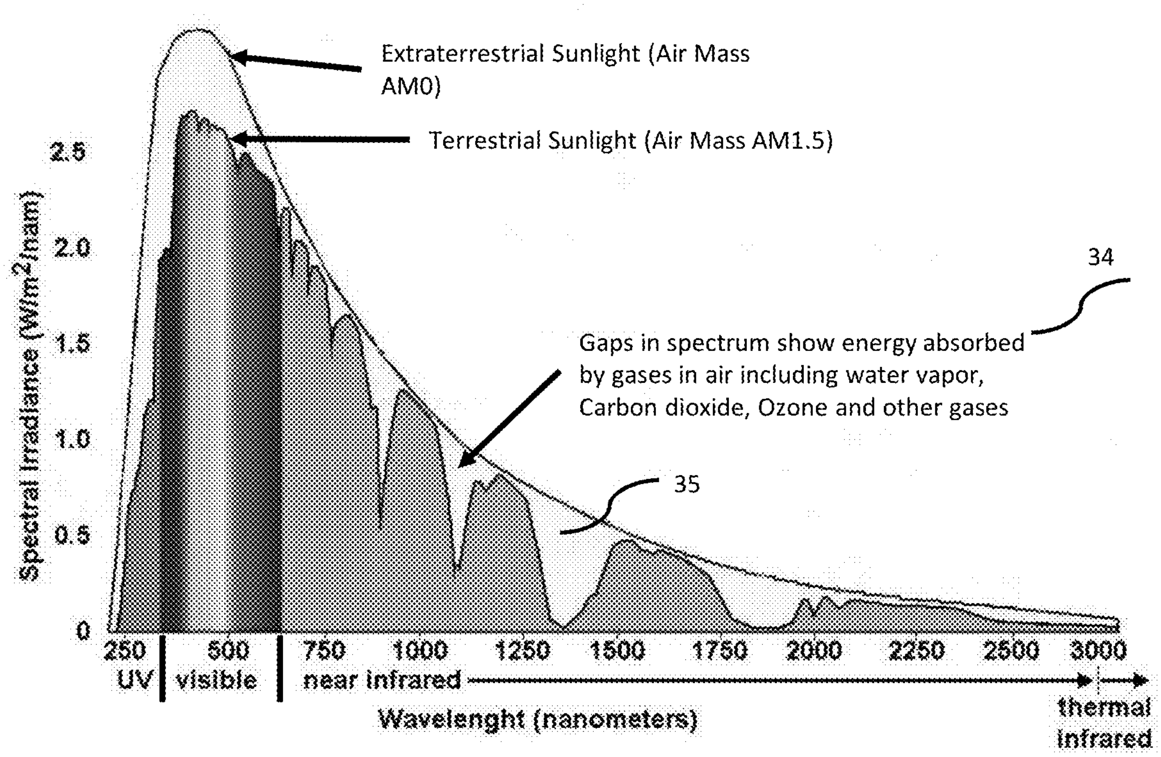
FIG. 3 illustrates a graph of the solar terrestrial spectrum at sea-level (AM 1.5).

The device(s), such as those shown in FIGS. 1-2, disclosed herein simulate the sun's electromagnetic (EM) energy, as shown in FIG. 3, when measured at the Earth's sea level at different Air Mass (AM). The sun's EM energy changes throughout the day and seasons depending on the angle from zenith of the sun FIG. 4 and the time of the year and day FIG. 5. All these different values of the sun's projected energy (wavelengths and irradiance FIG. 3) and solar illumination FIG. 6 are simulated by the device(s) disclosed herein, either automatically or manually, controlled by the end-user or the device. For example, the sun's spectral range at AM 1.0-2.0 is approximately 250-3000 nm.

In one configuration, the device deploys LEDs 24, with the accompanying power-supply and drivers 3, covering a spectral band of wavelengths FIGS. 7*b* & 7*c*, with the device controlling the power levels of each single LED 24 separately. In other configurations, the device 1 is comprised of LEDs 24 and other different types of lights that radiate a portion of the solar EM spectrum 7*a*. Thus, in accordance with this disclosure the "device 1" described herein can comprise one or more devices, such as a controlling device that controls other devices, such as the LEDs described above.

At least one light panel 2 can be daisy-chained with at least one other light panel 2 to link them together.

Figure 9:
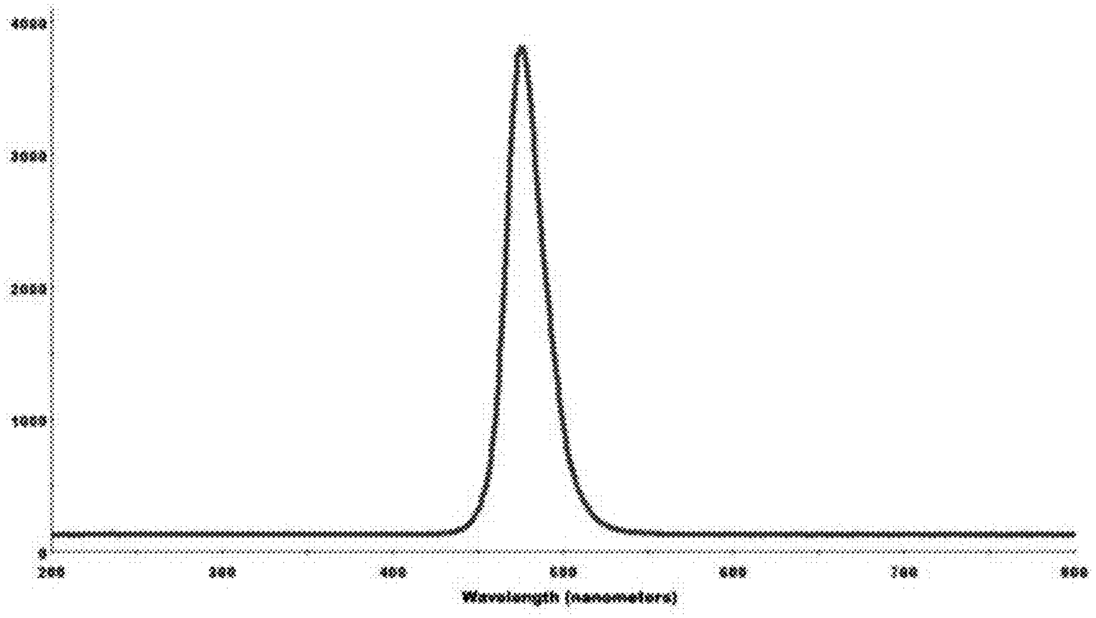
FIG. 9 illustrates the mono-chromatic characteristics of an LED.

In the configuration that deploys LEDs, the light panel/fixture 9-10-11-12 contains multiple LEDs 13-14-15-16 (comprising any configuration such as single LEDs, DIP, SMD, COB, etc.) of different wavelengths 24. These wavelengths comprise the solar spectrum to mimic that of the sun FIG. 3. LEDs have a narrow spectral output FIG. 9 centered on a specific wavelength and are considered "almost" monochromatic. The light panel 9-10-11-12 comprises at least one LED per wavelength 24, a fraction of a wavelength or a block of wavelengths. The layout of the LEDs 13-14-15-16 is related to the specifications of the panel, e.g., size, the total power output (wattage) and shape of the panel. In certain configurations, the light panel/fixture 9-10-11-12 can be housed in either a ceiling mounted fixture 9, floor lamp 10 or desk lamp 11, wall panels 17 and Edison Screw (E27) bulbs 12.

Humans have several photoreceptors in their eyes that are sensitive to different wavelengths/colors. The location of these photoreceptors is aligned (lower-eye or upper-eye) with the correlating position/angle of the sun (sunrise and sunset). This is not surprising since our anatomy evolved under the sun and adapted to become the most efficient and effective. The light panel/fixture 9-10-11-12 that are part of the device 1 disclosed can simulate the sun's angle and expose the photoreceptors in our eyes at the right angle, by "flowing" 18 the light over different light panels as they are working in harmony. Since the device can consist of multiple light panels, such as wall 17 and ceiling 9 panels, the distribution of the spectral illumination representing the color temperature of that time of the day, can be transferred from one panel, where it starts radiating, in one or more wavelengths, to the next panel by taking over the spectral radiation and simulate the angle of the sun through its daily sunrise and sunset path. For example, at sunrise, when the angle of the sun is almost ninety degrees compared to zenith FIG. 4, the color temperature is warm/red 19 (<2000 Kelvin) and at high noon, the temperature is blue 20 (>6000 Kelvin). Light sources in a wall mounted panel 17 representing these wavelengths/color temperatures (as graphically depicted in FIGS. 5 and 19 and 20, for illustration purposes only since they are embedded in the light panel 17-9 itself) would start illuminating at the bottom of the light panel 17-9 and flow-up to the top of the light panel 17 while changing the color temperature/wavelengths in accordance with the time of the day. At some point in the morning, the light will flow/overlap into the ceiling mounted light panel 9, again to represent the angle of the sun and the correlated color temperature. Later in the afternoon, the opposite affect will take place to mimic the sunset of that day.

Each LED can separately be turned on/off 24; the EM energy (light, visible and non-visible) output is controlled, either manually and/or automatically via the device 1. This distinct control over the LEDs allows the device to simulate the correct solar spectrum correlating to the desired output. Any wavelength, or combination of wavelengths, can be selected within the spectrum of available LEDs 24.

In manual mode, an end-user has complete control over which LED(s) 24 to turn on or off and at the desired intensity. In automatic program-mode, preprogrammed settings (preprogrammed modes/settings can be updated or added over the IoT platform 8) will control when the LED is turned on/off and at the desired intensity. In the dynamic mode, solar light-meter 7 will control the settings of the device based upon the real-time spectral input from the sun wherever these solar light-meters are located around the world FIG. 11. This will give an end-user in Washington D.C. the spectral output, in near real-time, of the sun's spectrum as measured in e.g., Quito, Ecuador. In another configuration, the device obtains information from online solar radiant calculators through a Cloud-based IoT platform 8.

Automatic program-mode mode will turn the LEDs 24 on with those wavelengths according to the solar spectrum FIG. 3 at that time of the day based upon the location associated with the selected program. The device will adjust the illuminance (LUX) FIG. 6 and color temperature FIG. 5 (with possibly all solar wavelengths and not just a few as Circadian lights do) to correlate with the wavelengths produced by the sun at specific times of the day FIG. 5. Color temperature (or, Correlated Color Temperature (CCT), in Kelvin 21, changes throughout the day based upon the position of the sun in the sky (zenith or angle from zenith) FIG. 4.

For instance, at 8 am in July in Washington D.C., the light illumination of the device 1 will project the cycle of the solar spectrum which is similar with the one outdoors. In this particular instance, it will contain IR, VIS in the early morning 22 and UVA spectrum will be added mid-morning 23. Going through the cycle, sometime later in the morning 25, UVB will be added to the spectrum. Later in the mid-afternoon, UVB spectrum will disappear 26 and in the early evening, UVA will be omitted and only the VIS+IR 27 will remain until sunset. During this entire spectral cycle, power levels will be properly adjusted to match the correct settings. After sunset, the light can be used as a healthy illumination device to radiate certain wavelengths to avoid, e.g., high-energy visible (HEV) light and Blue-light hazard. The wrong wavelengths can deregulate the circadian rhythm, suppress melatonin release, and cause eye health issues which can be avoided by selecting certain wavelengths/colors 19 after sunset. However, the end-user can override these pre-programmed settings if they desire to do so.

The end-user can select several preprogrammed modes from other world-wide locations, on their device. The end-user can create his own spectral radiance programs and save them for later use. These custom created programs allow the creator to grant permissive use to other users via the cloud-based service. The end-user has complete control over which LEDs 24 are turned on and their desired power levels. This can all be accomplished from several devices, e.g., LCD touch control wall panel 28, mobile device 29, internet connected computer or a home automation device (Amazon Alexa, Google Assistant, etc.).

Another aspect of the automatic mode is that the device can radiate a different spectrum (colors and power levels) than what the sun would radiate outside at that time of the day. This will accommodate for the fact that humans, and animals, seek the shade during peak solar hours and would not get the full power of the sun, which would be harmful when receiving too high of a dose. The device will lower, or eliminate, the "high intensity" wavelengths (e.g., UV 31 and blue light 20) during these periods and up-regulate the spectrum intensity again after a scheduled time. This can also be manually selected by the end-user via the device.

Since the device contains separate LEDs FIG. 7*c* covering the entire solar spectrum FIG. 3, it has the capability to facilitate Chromotherapy and Photobiomodulation (PBM) needs. PBM capabilities can be incorporated in the, but not limited to, the wall panels 17 since these have more red and IR 19 light sources than the overhead ceiling panels 9. It is well understood that certain specific wavelengths and colors have healing properties when applied at the right dose (e.g., joule). Although chromotherapy and PBM use light in different ways, the device can support both since each wavelength, at its own strength, can be controlled and utilized. In certain configurations, such as wall panels 17 in combination with overhead ceiling fixtures 9, the device has greater capabilities than current PBM and Chromotherapy devices.

Figure 11:
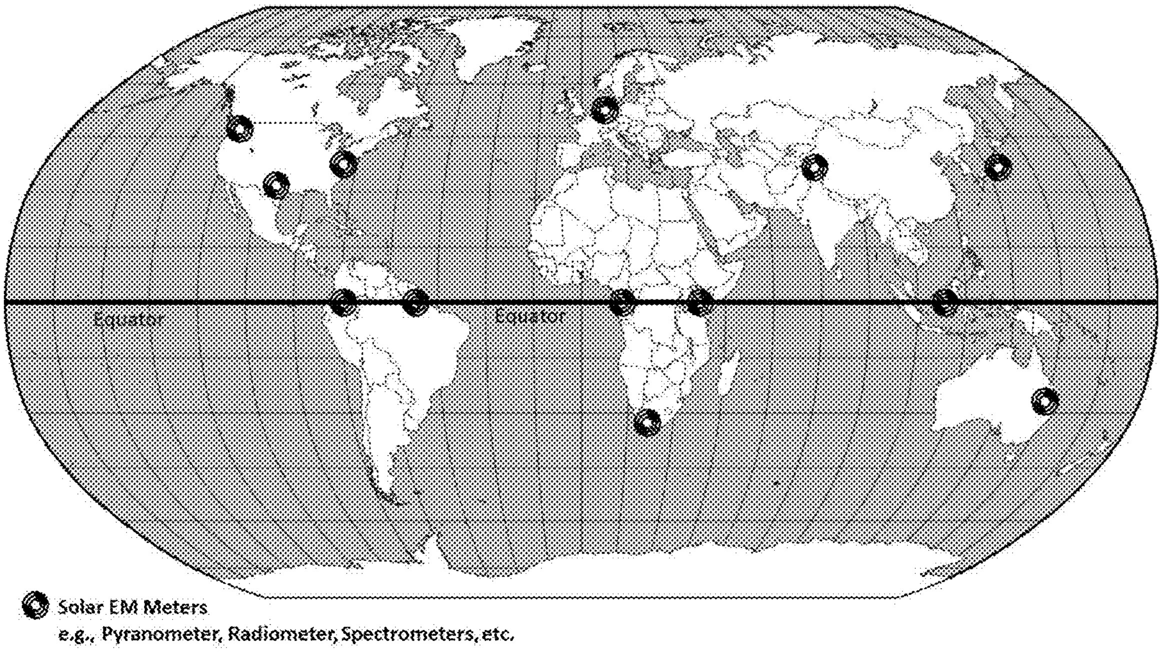
FIG. 11 illustrates the possible location of the solar light meters (EM meters) in the different locations around the world.
Figure 13:
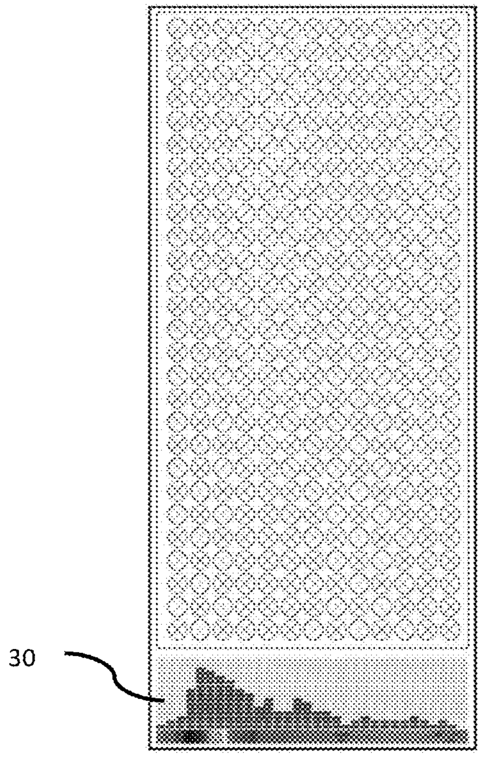
FIG. 13 illustrates one embodiment of the visual spectral feedback embedded in the light panel.

The device can also be connected to the Cloud through an IoT platform 8. An enhanced feature is provided by the IoT platform 8 where world-wide distributed solar EM/light meters FIG. 11 are providing near real-time solar spectral measurements to a plurality of the device connected via the Cloud. For instance, a solar light meter located in Quito, Ecuador, will measure real-time solar spectrum and relate this data through the Cloud to the platform's controller software 5, where it can be accessed by the plurality of the device 1, such as if they have permissions to this service. This means that a device 1 located in Oslo, Norway, can radiate the near real-time solar spectrum recorded in Quito, Ecuador. Since many solar EM meters are located in different places around the world FIG. 11, the end-user can select any of the locations available.

Since the Solar light meters 7, as a near real-time spectral input instruments, are world-wide deployed FIG. 11, they can be located in a different time-zone and selecting a solar spectrum radiation mode that is not in sync with the time zone where the device 1 is located, this will disrupt the end-user's circadian rhythm. Therefore, the device 1 will deploy a "delay-mode" where the solar spectral data obtained from the light meter 7, in a different time zone can be delayed, either dynamically or manually, to ensure that it is in sync with the user's circadian rhythm and is not negatively affected.

The device 1 can radiate the correct solar spectrum FIG. 3 regardless of atmospheric conditions for any location in near real-time or with a delayed response. When light passes through the atmosphere, it is subject to reflection, refraction, diffraction, and absorption 34. The combined effect of these processes is scattering of the original light beam coming from the sun. The atmosphere includes molecules of gases (such as nitrogen, oxygen, water vapor, and carbon dioxide 34) and suspended solid particles (such as dust, soot, salts, and chemical precipitates, collectively called aerosols) which can block some of the spectrum. The amount and type of aerosols present, the amount of moisture in the air, and the altitude above sea level are the primary variables determining the scattering that will occur and determine the light upon Earth and we will observe. Because of the included light meters 7, installed outside, they measure the real-time solar spectrum and instructs the device 1 to radiate the correct spectrum by dynamically controlling the light source at the corresponding power-levels FIG. 3. Man-made pollution can affect the real-time simulated solar spectrum received by the light meters 7 in a negative effect, but the device can override and adjust this problem and radiate a "healthier" spectrum inside than observed outside the space where the light panels 2 are installed by automatically adjusting the spectrum.

Since the device can radiate the actual solar spectrum in near real-time provided by the solar light meters, the Fraunhofer lines 35 (Omission of certain spectrum due to atmospheric conditions, etc.) can be represented within the device's 1 spectrum FIG. 3.

To ensure that individuals receive the correct amount of ultraviolet (both UVA and UVB) radiation, the platform does include dose calculators. These calculators take into consideration several variables such as someone's Fitzpatrick skin type, age, BMI, clothing worn, etc. Dose calculators use certain formulas, but not limited to, e.g., $J/m2=W/m2\times time(s)$ to control the light output of the panels based upon the numbers the calculator computes. These calculators can be part of the mobile app 4 executed by the device 1, cloud-based network 8, and/or control wall panels 17 and can take input from sensor 6, in this case, a light sensor that measures the amount of UV light the individual/area has received.

Figure 10:
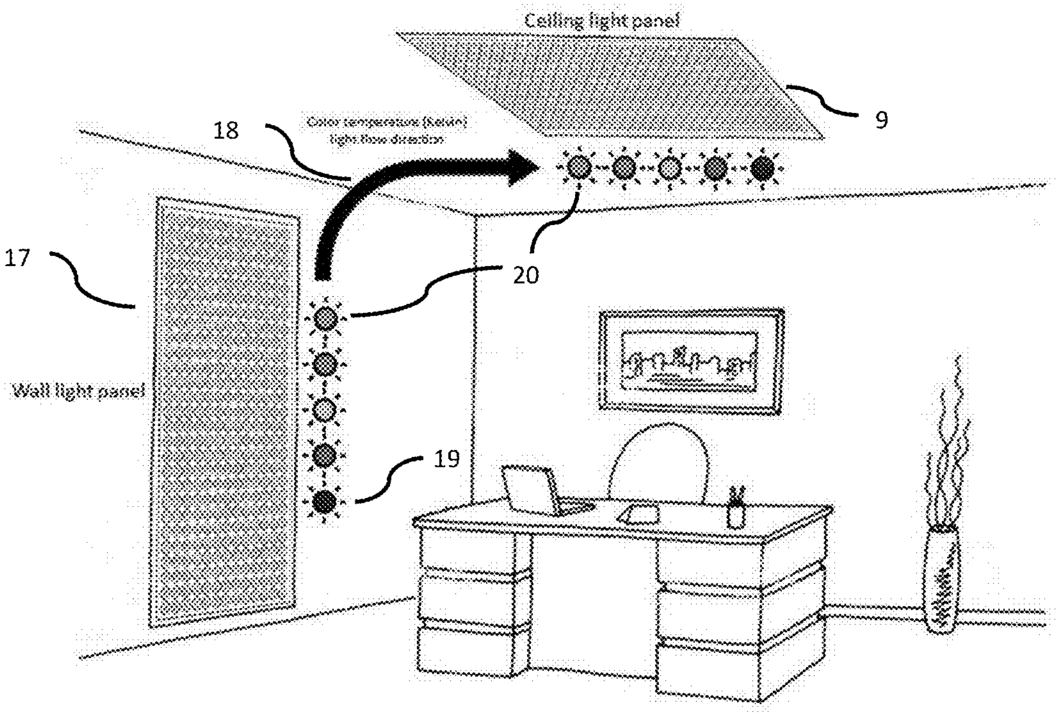
FIG. 10 illustrates how the solar spectrum/color-temperature will flow from the wall panel to the ceiling panel to simulate the angle of the sun during the time of the day (sunrise and sunset).

Since wavelengths outside (UV & IR) the VIS are not detectable by the human eye, one cannot visually observe if the light panels 9-10-11-12 is radiating this energy at any given time since these [outside the VIS spectrum] LEDs radiate light our eyes cannot detect. To provide confirmation that these wavelengths are emitted (LEDs are turned on), an indication is provided by visual feedback FIG. 10 to the end-user. In one configuration, this could be an LCD panel 30 displaying the device's radiated spectrum by using visible colors representing the invisible spectrum, e.g., purple/violet for UV and different shades of RED for IR.

The device 1 can, in a configuration, have several entertainment settings which can be used for different occasions like "mood" and "party" modes. E.g., the device 1 can display running lights that simulate disco lights, just one single color or a starlight simulation.

The assembly of this device's 1 configuration, individual controllable LEDs 24 covering the entire solar EM spectrum, will allow for new modes and programs based upon newly found understandings of light and its effect on our health.

The device may also include an embedded resonance generator 33 to provide additional health benefits than those discussed above. Phonons are quanta of vibrations that include sound, and certain frequencies are known to produce positive physiological and psychological stimulations.

System Components

The device comprises of the following components, but is not limited to:

[Illumination Panel 2] Certain configurations disclosed relate to the illumination panel include, but are not limited to, a ceiling mounted fixture 9, floor lamp 10 and desk lamp 11, wall panels 17 and Edison screw bulbs 12. The device 1 consists of parts which can contain different illumination devices, e.g., LEDs 24. Since LEDs are monochromatic FIG. 9, each LED will produce a narrow wavelength representing a fraction of the solar spectrum (The light emitting diode itself produces a highly peaked output but there is some broadening near the bottom of the axis). The size and shape of the panels are aligned with the overall fixture 13-14-15-16 as described above or can be custom manufactured per requirements. The light panel 2 can be enhanced by aids, e.g., to focus or diffuse illumination, such as a Fresnel lens.

[Power supply/Driver 3] The LED power supply/driver 3, will control the electrical current(s) to LEDs on the panel to perform multiple functions, e.g., dimming and/or color sequencing.

[Controller Software 5] The Controller Software 5 will, one of its many functions, instruct the Driver 3. The communications channel between the driver/light-panel and controller software 5 can either be hardwired or wireless. The Controller Software 5 has multiple preselected programs to set lighting patterns based upon programs that are preinstalled and/or customized programs by the end-user. The Controller Software 5 can also receive input from the solar light meters. The Controller Software 5 runs on any of the hardware controller devices 4. It is presented to the end-user as an application with a Graphical User Interface (GUI), sensors and/or voice controls. The application can perform many functions such as but not limited to, management of the device, visual feedback of the performance of the device (e.g., display the solar spectrum graph of the device), etc. The application (Apps and firmware) can be upgraded to add functionality, security updates, or on any other basis to enhance the device.

Figure 4:
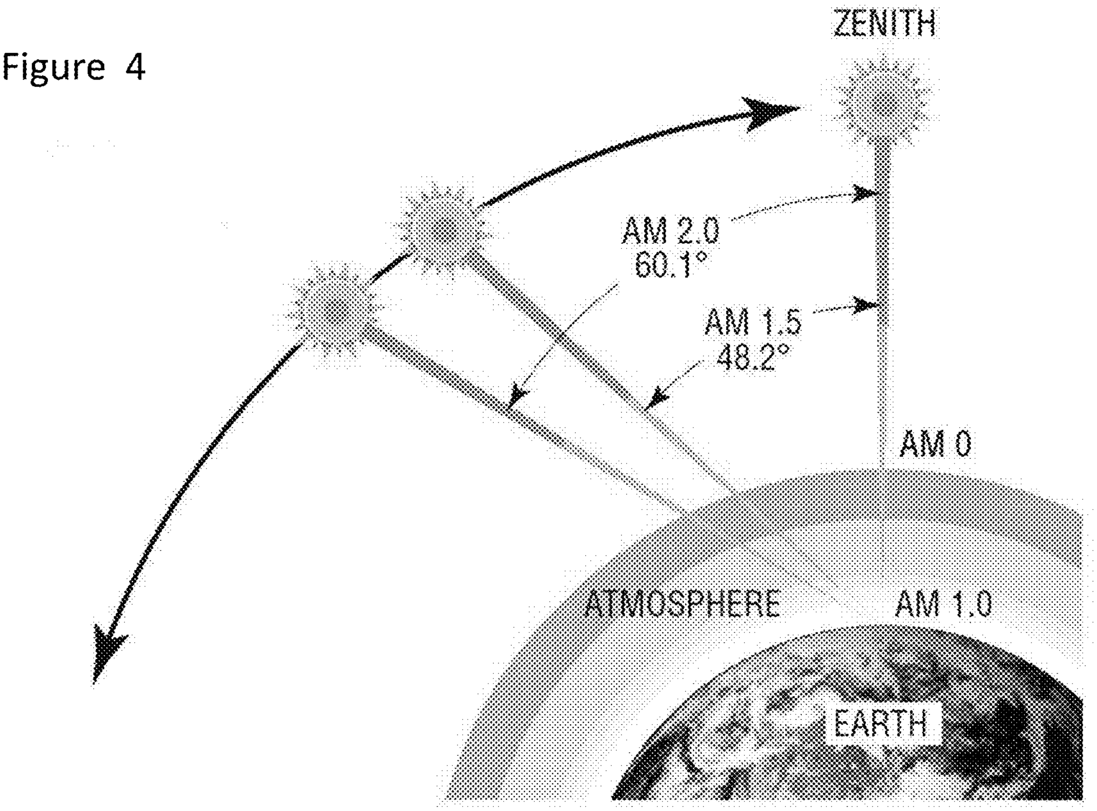
FIG. 4 illustrates the sun at zenith and several other degrees from zenith with the relating Air Mass (AM).
Figure 5:
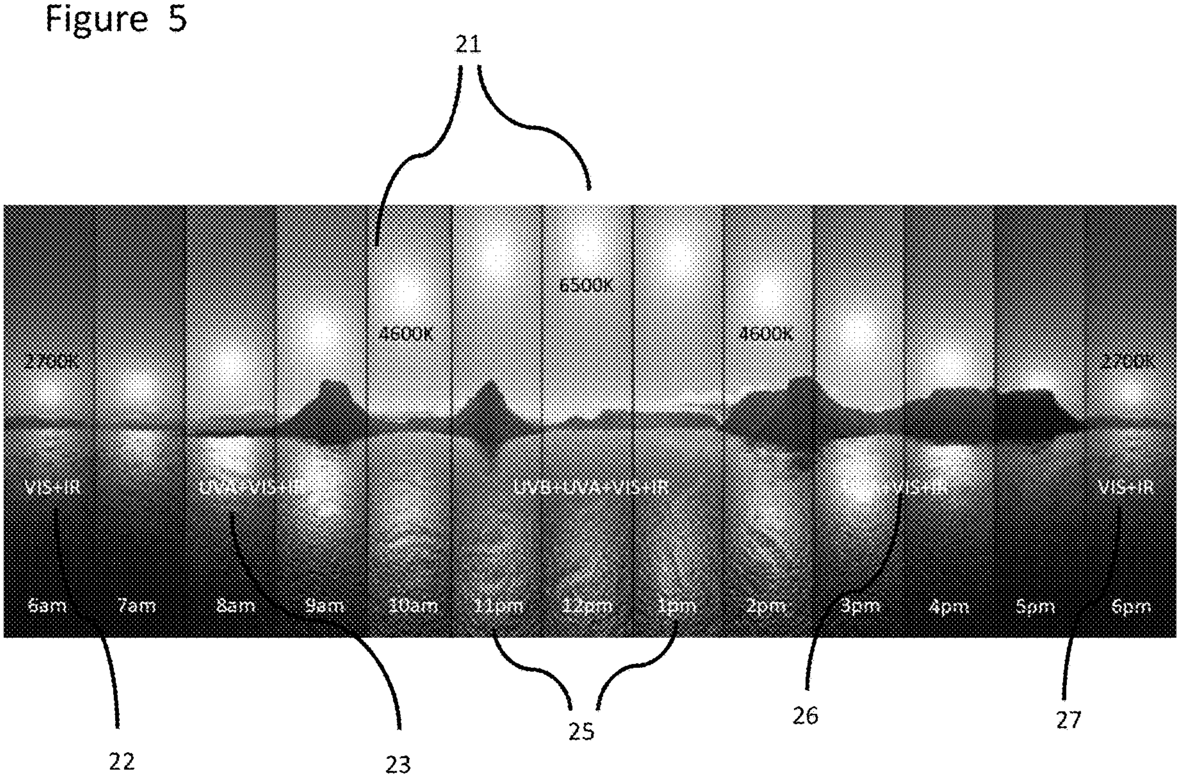
FIG. 5 illustrates an image of the changing color temperature during the day from sunrise till sunset.

[Controller Hardware FIG. 4] The hardware/panel controller 4 is the interface between the Controller Software 5 application and the end-user. Certain configurations of the hardware controller include, but are not limited to, an LCD panel, computer (desktop, laptop, etc.) dashboard and mobile device 29 (phone, tablet, smartwatch, etc.).

Figure 8:
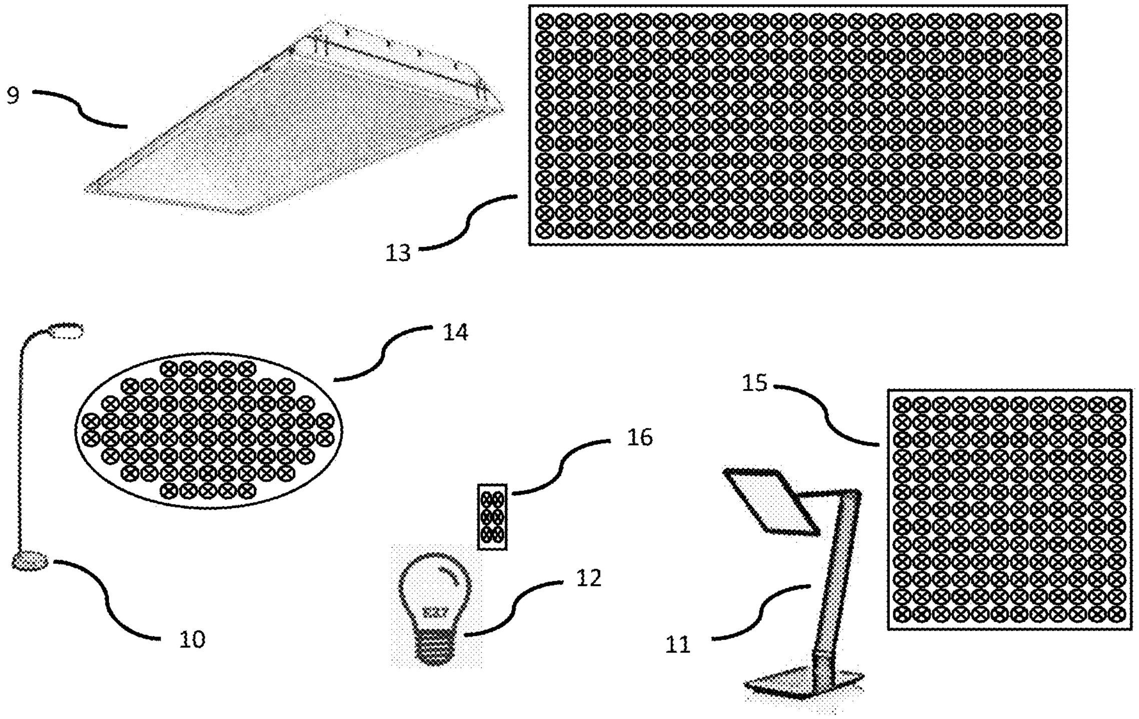
FIG. 8 Illustrates some of the possible embodiments of the light source (light panel).

[IoT platform FIG. 8] The Cloud/IoT platform 8 is a cloud-based configuration that connects the device, Solar light Meters 7, hardware controllers 4 and future devices/services to make the system whole.

[Solar light Meters 7] The Solar light meters 7 will provide near real-time solar spectrum input to the device. These light meters 7 can be a single device such as Pyranometer, Radiometer, Spectrometers, Spectroradiometers, etc., or a combination thereof. By contrast, the Controller Software 5 can delay this spectrum by several hours by matching the time zone in which the receiving device is located with the circadian rhythm of the user's zone. Solar light meters 7 are located around the world FIG. 11, in particular along the equator, to receive the sun's spectrum and through the IoT platform 8, deliver that data to the devices 1 installed at the end-user locations. Since solar radiation FIG. 3 reaching the earth's surface varies significantly with location, atmospheric conditions, time of day/year, earth/sun distance, etc., these globally positioned solar light meters will allow the device to represent patterns simulating the solar energy radiation, in near real-time, based on these global locations.

[Sensors 6] The device can contain several sensors 6 to perform a multitude of functions. These sensors 6 could include, but are not limited to, motion detector sensors, light sensors, air pollution sensors, etc. Light sensors 6 are used, but not limited to, to measure, and calibrate, the emission intensity of the device 1 and adjust the output accordingly to radiate the correct spectrum if there is any fluctuation. Motion detection sensors can be used, but not limited to, to detect if a person is present in the area and adjust the settings that control the device 1. Air pollution sensors 6 can be installed outside to measure the air quality and the amount of pollution in the air.

Systems Programs/Modes

The device facilitates several programs/modes. Each with its own desired output or several modes can be combined to meet the needs of the end-user. These modes can be, but are not limited to:

[Solar Spectrum output] The device 1 will radiate the entire solar spectrum FIG. 3 from approximately 250-3000 nm corresponding with the sun's spectrum at Earth's sea-level depending on the end-user's selection of programs.

[Vitamin D mode] Vitamin D is essential for our immune system and vitamin D deficiency has been contributed to many deceases. The peak absorption wavelength to create vitamin D is around 293-295 nm 31 and the light panels 2 that comprises this configuration will contain UVB light sources 31, such as, but not limited to, LEDs. To provide the optimal exposure to the body (assuming that minimum or no clothes are worn), the wall mounted panels 17 will be the fixtures with the majority of the UVB LEDs 31. To offset the harmful effects of higher-energy wavelengths (UV and Blue light), the deep-red and IR LEDs 24 will also be turned on within the vitamin D mode since these lower-energy wavelengths are the anecdote to UV and blue light. The Vitamin D mode requires an end-user to provide personal information, (this can be done on the mobile App or other means) such as Fitzpatrick skin type, age, BMI, clothing worn, etc. to calculate the right dose to produce Vitamin D and to shut-down the system when the correct dose is reached.

[UVC/germicidal sanitizing mode] The device 1 includes a germicidal sanitizing mode to sanitize the air and surfaces in a room. Since the device 1 contains a wide UV spectrum, different wavelengths can be selected, or combinations thereof, to meet the requirements of its purpose. Some modes operate in the Far-UV (~222 nm 32) range, no harm to humans or animals is warranted since this wavelength does not penetrate deeper than the utmost upper-layer of the skin, but other modes can utilize UV wavelengths that are potentially harmful to humans and can only be operated with no one in the room. The device allows a user to select these other modes in areas where there are not humans to harm.

[PBM Mode] The Photobiomodulation (PBM) or Chromotherapy modes allows the end-user to select certain single, or a combination, of wavelengths depending upon the desired treatments. Exposure timers, to ensure that the correct dose is received, could be included in the controller hardware 4 and controller software 5.

[Entertainment Mode] The device 1 has a mode to facilitate the entertainment needs of the end-user. This could include, but is not limited to, one single color, running color lights (disco effects), strobe lights, etc. In addition to the pre-programmed entertainment modes that come with the device, the end-user will have the ability to program their own entertainment modes or control the device in real-time.

[Resonance mode 33] The resonance mode 33 provides additional health benefits such as, but not limited to, vibrations that include sound, as certain frequencies are known to produce positive physiological and psychological stimulations.

What is claimed is:

1. A solar spectrum simulation device comprising;;

at least one light panel including at least one ultraviolet (UV), visible (VIS), or infrared (IR) light source and an associated power supply or driver;

controller hardware;

controller software executed by the controller hardware;

at least one sensor coupled to the device;

at least one light meter coupled to the device via a networked communication interface; and a networked communication platform configured to connect the device to the Internet.

2. The solar spectrum simulation device of claim 1, wherein the at least one light panel comprises individually controllable light sources combined to reproduce a solar spectrum measured at Earth sea level for different air mass values, including wavelength, irradiance, and illuminance characteristics.

3. The solar spectrum simulation device of claim 1, wherein specific wavelengths emitted by the at least one light panel are selectively added or removed, manually or automatically, to simulate a solar spectrum corresponding to a time of day and a time of year.

4. The solar spectrum simulation device of claim 2, wherein a spectral output of the at least one light panel is manually or automatically controlled in accordance with at least one of time of day, time of year, geographic location, or altitude.

5. The solar spectrum simulation device of claim 1, wherein the networked communication platform interfaces the controller software and the controller hardware with deployed sensors, deployed light meters, and home automation devices.

6. The solar spectrum simulation device of claim 5, wherein at least one sensor or light meter is deployed at a remote location and configured to collect real-time solar spectral measurements that are transmitted through the networked communication platform to the solar spectrum simulation device.

7. The solar spectrum simulation device of claim 6, wherein the real-time solar spectral measurements are delayed, automatically or manually, by a selected time period to align circadian rhythm simulation with a location of the device.

8. The solar spectrum simulation device of claim 1, wherein the at least one light panel is implemented as at least one of a ceiling panel, wall panel, desk lamp, floor lamp, or Edison screw bulb.

9. The solar spectrum simulation device of claim 1, wherein the at least one light panel is daisy-chained with at least one additional light panel by wired or wireless control such that multiple light panels operate in coordination.

10. The solar spectrum simulation device of claim 1, wherein at least one light panel operates in coordination with at least one other light panel to provide overlapping spectral outputs representing a distribution of wavelengths, irradiance, and color temperature corresponding to a solar angle at a time of day.

11. The solar spectrum simulation device of claim 1, wherein the device is connected to and controlled through at least one home automation system including a voice-controlled assistant.

12. The solar spectrum simulation device of claim 6, wherein the controller hardware displays a graphical user interface representing a plurality of deployed solar light meters and allows an end user to select a solar light meter, and an associated operating mode to control a spectral radiation output of the device.

13. The solar spectrum simulation device of claim 1, wherein the at least one light panel emits ultraviolet-C radiation configured to provide germicidal functionality.

14. The solar spectrum simulation device of claim 1, further comprising an embedded resonance generator configured to generate vibrational energy including acoustic vibrations to provide physiological or psychological stimulation.

15. The solar spectrum simulation device of claim 1, further comprising a visualization display configured to represent ultraviolet and infrared wavelengths to indicate to an end user that invisible-spectrum radiation is being emitted.

16. The solar spectrum simulation device of claim 1, wherein at least one ultraviolet light source embedded in the light panel is operated according to pre-programmed modes that account for variables including skin type classification, age, body mass index, and clothing coverage.

17. The solar spectrum simulation device of claim 1, wherein an intensity of the at least one light panel is automatically adjusted to modify spectral intensity and color to simulate reduced exposure during peak solar noon and increased exposure after a scheduled time.

18. The solar spectrum simulation device of claim 1, wherein real-time simulated solar radiation, is adjusted based on measurements from at least one connected air quality sensor to compensate for atmospheric conditions such that the light panel emits a modified spectrum corresponding to reduced external pollution.

* * * * *